United States Patent
Candelora et al.

(10) Patent No.: US 11,538,648 B2
(45) Date of Patent: Dec. 27, 2022

(54) CIRCUIT BREAKER WITH PLUG-ON CONNECTOR

(71) Applicant: ABB Schweiz AG, Baden (CH)

(72) Inventors: Andrew Candelora, East Haven, CT (US); Timothy Louis Thomas, Middletown, CT (US); Jason Edward Harmon, Bristol, CT (US); Nagesh Venkata Tumu, Unionville, CT (US); Brad Parlee, Maitland, FL (US); Cecil Rivers, West Hartford, CT (US)

(73) Assignee: ABB SCHWEIZ AG, Baden (CH)

( * ) Notice: Subject to any disclaimer, the term of this patent is extended or adjusted under 35 U.S.C. 154(b) by 336 days.

(21) Appl. No.: 16/877,817

(22) Filed: May 19, 2020

(65) Prior Publication Data

US 2021/0366679 A1   Nov. 25, 2021

(51) Int. Cl.
| | |
|---|---|
| *H02H 3/00* | (2006.01) |
| *H01H 71/08* | (2006.01) |
| *H01H 71/10* | (2006.01) |
| *H02H 3/16* | (2006.01) |
| *H02H 1/00* | (2006.01) |

(52) U.S. Cl.
CPC ............ *H01H 71/08* (2013.01); *H01H 71/10* (2013.01); *H02H 1/0007* (2013.01); *H02H 3/16* (2013.01)

(58) Field of Classification Search
None
See application file for complete search history.

(56) References Cited

U.S. PATENT DOCUMENTS

| | | | |
|---|---|---|---|
| 1,795,434 | A | 3/1931 | Leppert |
| 7,957,122 | B2 | 6/2011 | Sharp |
| 8,929,055 | B2 | 1/2015 | Potratz et al. |
| 8,953,306 | B2 | 2/2015 | Wheeler et al. |
| 9,450,359 | B2 | 9/2016 | Rathjen et al. |
| 9,548,548 | B2 | 1/2017 | Potratz et al. |
| 9,666,398 | B2 * | 5/2017 | Robinson ............... H01H 71/10 |
| 9,806,502 | B2 | 10/2017 | Cordova Diaz |
| 2012/0132506 | A1 * | 5/2012 | Potratz ..................... H01H 9/20 200/43.11 |

\* cited by examiner

*Primary Examiner* — Stephen W Jackson
(74) *Attorney, Agent, or Firm* — Greenberg Traurig, LLP

(57) ABSTRACT

A circuit breaker is provided that may be plugged onto an electrical panel. The circuit breaker is preferably a low voltage circuit breaker in the range of 120-240 volts. The circuit breaker has an electrical clip with a curved inner surface that contacts a curved outer surface of an electrical connector on the electrical panel.

20 Claims, 4 Drawing Sheets

CIRCUIT BREAKER WITH PLUG-ON CONNECTOR

BACKGROUND

The present inventions relate generally to circuit breakers, and more particularly, to a connection between the circuit breaker and an electrical panel.

Circuit breakers are used to open an electrical circuit when an electrical anomaly has occurred in the circuit, such as a high current draw caused by a short in the circuit. Low voltage circuit breakers, such as circuit breakers rated at 120 or 240 volts, are typically connected to an electrical panel with a plurality of different circuit breakers to provide protection for a plurality of respective electrical circuits in a building, such as a home or commercial building.

In normal use, a circuit breaker remains connected and fixed within the electrical panel. The circuit breaker typically has a switch lever that can be manually operated to open the electrical circuit and to reset the circuit breaker. However, it is common to add circuit breakers to an electrical panel both during new installations and replacements thereafter. For example, as electrical circuits are added to a building, new circuit breakers must be added to the electrical panel. Also, faulty circuit breakers are commonly replaced by removing the faulty circuit breaker and connecting a replacement circuit breaker onto the electrical panel. Since connecting circuit breakers to electrical panels is common, the inventors believe it would be desirable to provide circuit breakers with an easy and reliable connection to the electrical panel.

SUMMARY

A circuit breaker and an electrical panel are described. The circuit breaker may be an electronic circuit breaker (e.g., a ground fault circuit breaker or an arc-fault circuit breaker) with a first electrical clip and a second electrical clip. The first electrical clip may plug onto a neutral bar in the electrical panel. The second electrical clip may plug onto a power supply bus in the electrical panel. The first electrical clip has a curved inner surface that contacts a curved outer surface of the neutral bar. The engagement between the first electrical clip and the neutral bar makes it easier to install the circuit breaker onto the electrical panel compared to screw type connections. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
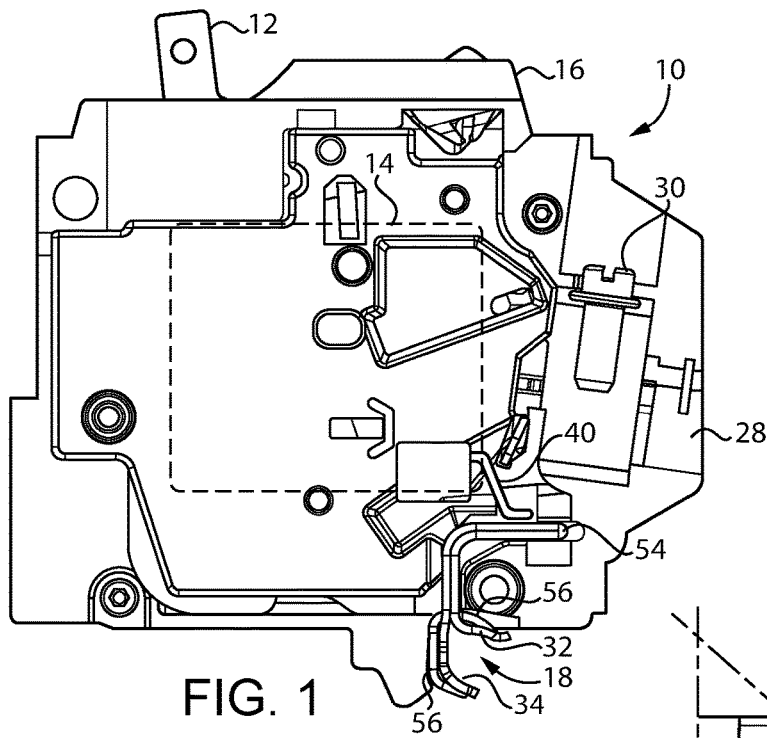
FIG. 1 is a side view of a circuit breaker.

Referring now to the figures, and particularly FIG. 1, a circuit breaker 10 is shown. As shown, the circuit breaker 10 has a switch lever 12 that may be manually actuated to engage and disengage an electrical switch 14. A housing 16 typically encloses the electrical switch 14. The electrical switch 14 is shown schematically in FIG. 1 without extra details since the operation of circuit breaker switches 14 are well known and not the subject of the present inventions. In general, the electrical switch 14 is set in an engaged mode by the switch lever 12. When an electrical anomaly, such as an overcurrent condition caused by a fault, occurs in the electrical circuit, the electrical switch 14 trips to open the switch 14 and disconnect the electrical circuit from the electrical supply. The switch lever 12 may also be used to manually open the electrical switch 14 to switch it to the disengaged mode if desired.

Figure 2:
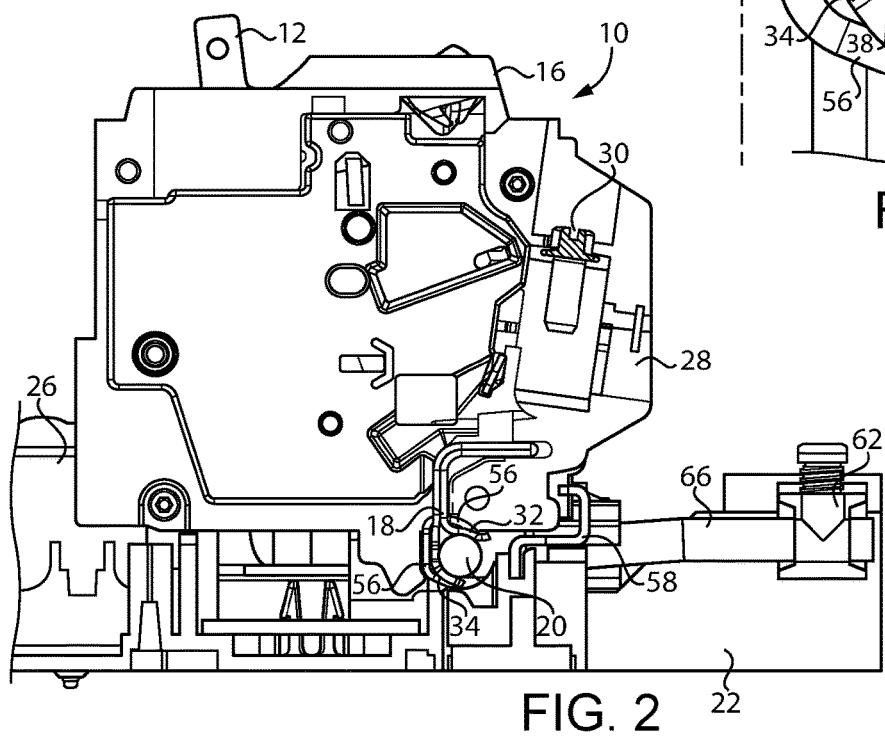
FIG. 2 is a side view of the circuit breaker plugged onto an electrical panel.
Figure 5:
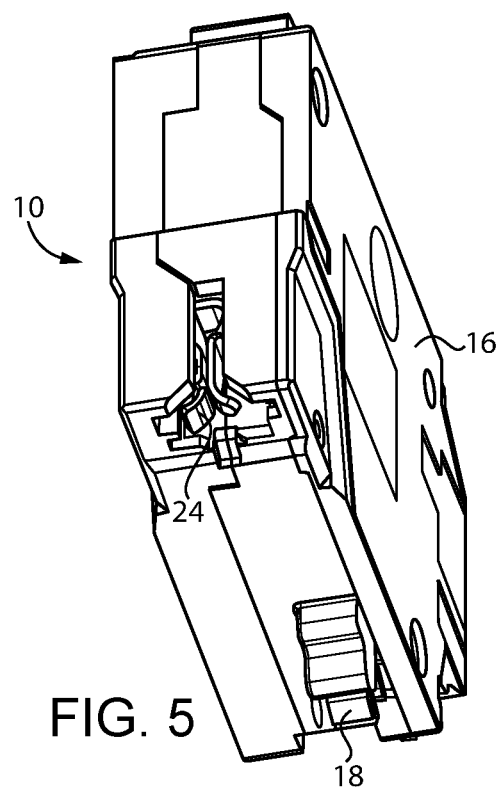
FIG. 5 is a perspective view of a second electrical clip of the circuit breaker.
Figure 6:
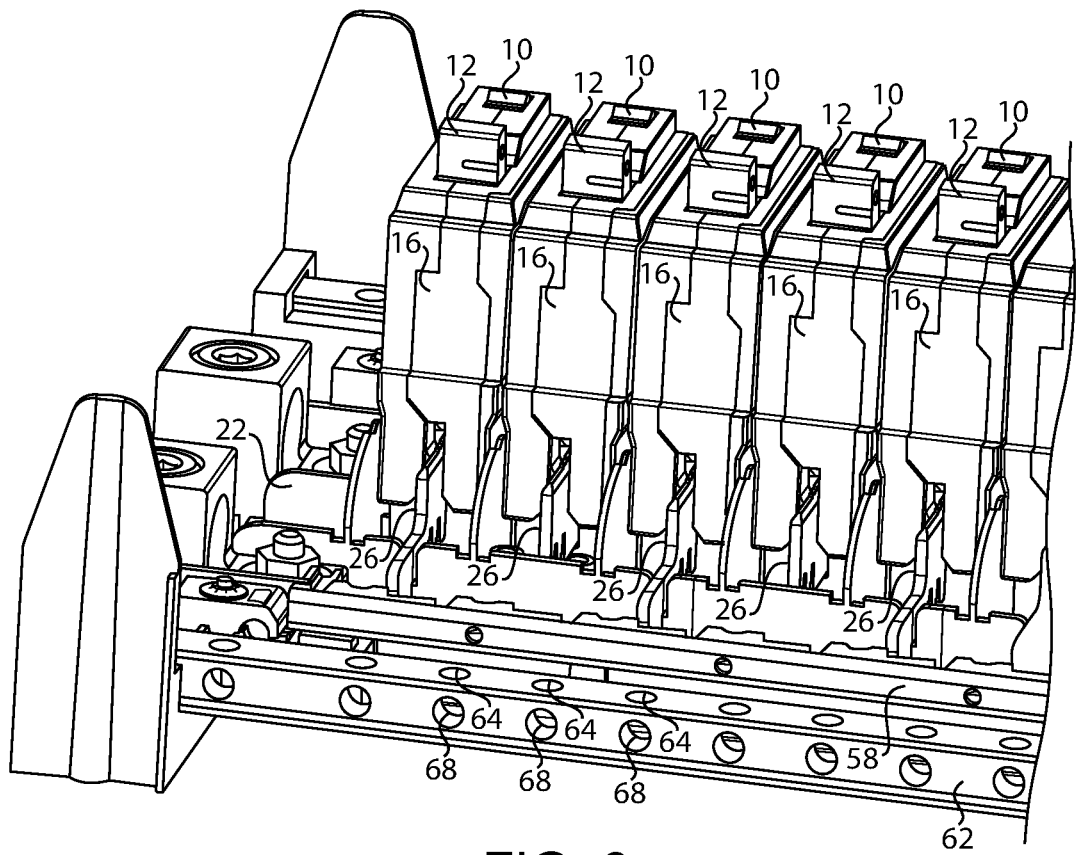
FIG. 6 is a perspective view of a plurality of circuit breakers plugged onto the electrical panel.

The circuit breaker 10 also includes a first electrical clip 18 to make electrical contact with an electrical connector 20 of an electrical panel 22. The electrical clip 18 is electrically connected with the electrical switch 14, e.g., with a wire 40, to transmit an electrical property to the electrical switch 14 that may be used to detect an electrical anomaly in the electrical circuit. It is understood that it is possible for the circuit breaker 10 to have a single first electrical clip 18 connected to the supply bus 26 if desired. Although it is possible for the electrical property to be the main electrical current supplied to the electrical circuit and the electrical anomaly to be an overcurrent condition, it is preferred that the electrical property is a current leakage in the electrical circuit between the electrical power supplied to the circuit and neutral or another anomaly that is detectable through the neutral side of the circuit. In this case, the electrical clip 18 may be connected to a neutral bus connector 20 in the electrical panel 22. The electrical switch 14 may also include a circuit board within the circuit breaker housing 16 to detect current leakage. It is understood that the circuit breaker 10 may have various types of intermediate circuitry between the electrical clip 18 and the electrical switch 14 to detect electrical anomalies. In one example, the electrical clip 18 connected to the electrical switch 14 and connected to neutral 20 makes the circuit breaker 10 a ground fault circuit breaker 10, an arc-fault circuit breaker 10 or a combined ground fault/arc-fault circuit breaker 10, which are types of circuit breakers commonly known in the art. Preferably, the circuit breaker 10 is a low voltage circuit breaker 10 rated at 120 or 240 volts. As shown in FIG. 1, it is preferable for the electrical clip 18 to extend out the bottom of the circuit breaker 10 opposite from the switch lever 12, which extends out the bottom of the circuit breaker 10. It is also preferable for the switch lever 12 and the electrical clip 18 to be on opposite lateral sides of the circuit breaker 10. For example, if a centerline were drawn vertically through the circuit breaker 10 of FIG. 1, the switch lever 12 would be on the left side of the centerline and the electrical clip 18 would be on the right side of the centerline. As shown in FIG. 5, the circuit breaker 10 may also have a second electrical clip 24 that connects to the electrical panel 22. The second electrical clip 24 is preferably on the bottom of the circuit breaker 10 on the opposite lateral side (e.g., left side in FIG. 1) from the first electrical clip 18. Preferably, the second electrical clip 24 is connected to a main electrical supply bus 26 in the electrical panel 22 as shown in FIG. 6. As shown in FIGS. 1 and 2, the circuit breaker 10 may also be provided with a connecting lug 28 that a wire or cable may be connected to. The electrical connecting lug 28 is preferably on the same lateral side as the first electrical clip 18 (i.e., the right side in FIG. 1) and preferably faces out from the side. The wire or cable may be secured to the connecting lug 28 with a screw 30. The second electrical clip 24 and the electrical connecting lug 28 are typically both connected to the electrical switch 14 so that the switch 14 can be opened and closed between the clip 24 and the lug 28 so that the switch 14 can break the supply of electrical current from the second clip 24 to the connecting lug 28 by opening the switch 14.

Figure 3:
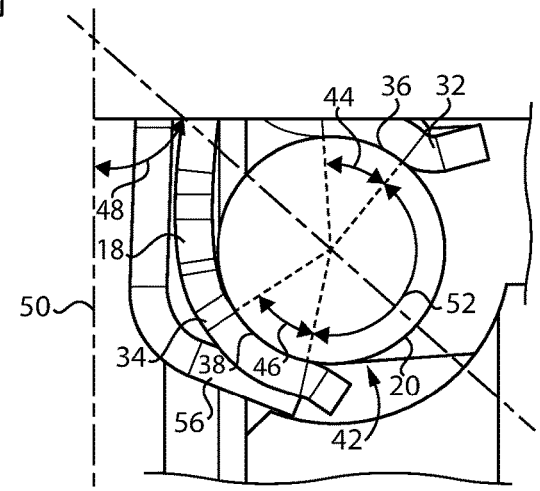
FIG. 3 is an enlarged view of a first electrical clip of the circuit breaker plugged onto an electrical connector of the panel.

As shown in FIG. 1, the first electrical clip 18 may have a first elastic arm 32 and a second elastic arm 34. As shown in FIGS. 2-3, the first and second elastic arms 32, 34 may each form first and second curved inner surfaces 36, 38, respectively. The curved inner surfaces 36, 38 of the elastic arms 32, 34 each contact corresponding first and second outer curved surfaces of the electrical connector 20 of the panel 22. As shown, the first and second curved inner surfaces 36, 38 may face each other so that they contact opposite sides of the electrical connector 20 on the panel 22. Thus, in the preferred embodiment, the curved inner surfaces 36, 38 wrap around a portion of the electrical connector 20. At least one of the elastic arms 32, 34, and preferably both of the elastic arms 32, 34, is electrically connected to the electrical switch 14 with a wire 40 or other electrical connector 40 to allow the switch 14 to detect an electrical anomaly through the electrical connector 20 of the panel 22.

Figure 4:
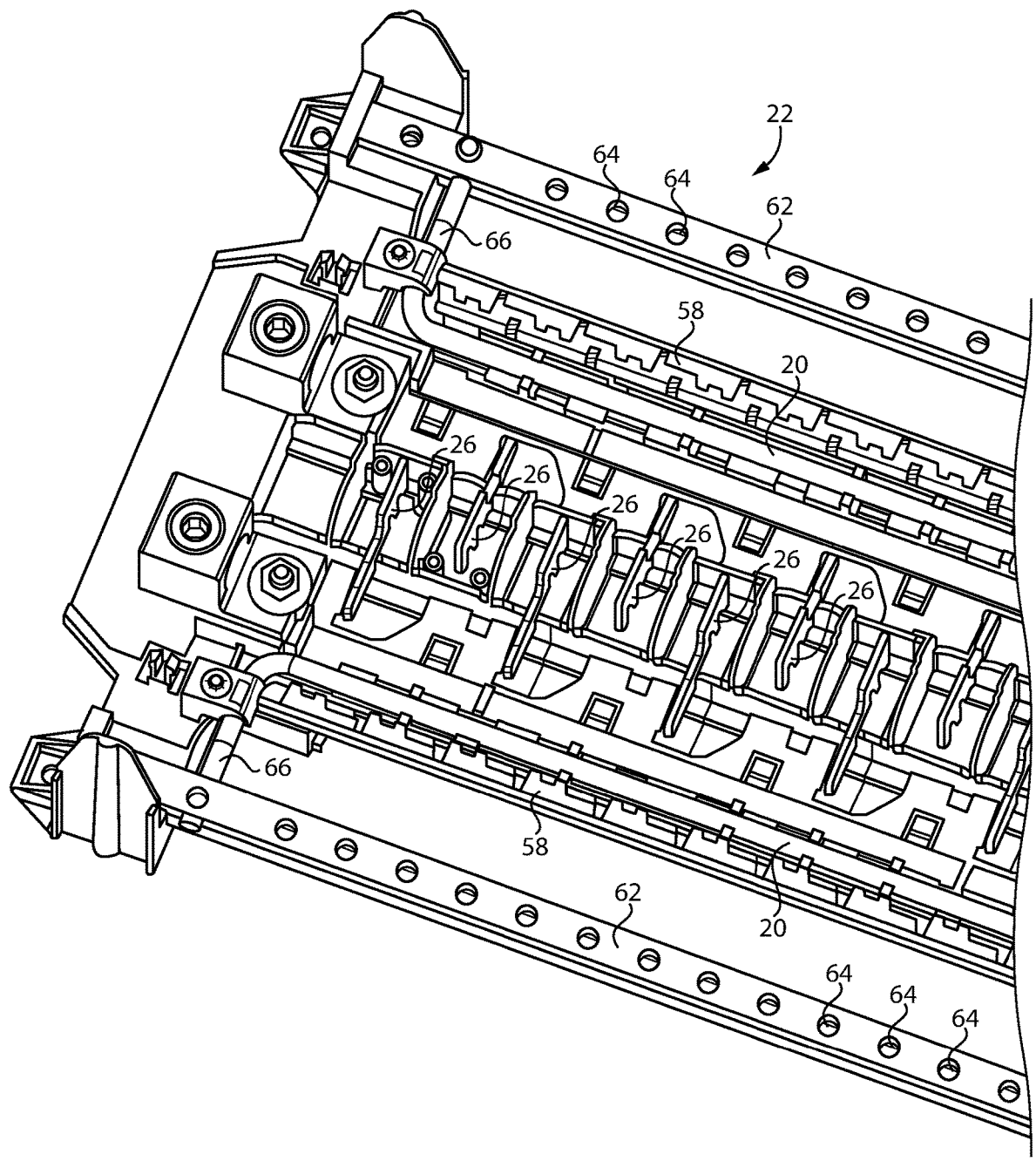
FIG. 4 is a perspective view of the electrical panel.

As shown in FIGS. 3-4, the electrical connector 20 is preferably a round bar 20 with a circular cross-section that extends along a length of the panel 22 that is longer than the width of the circuit breaker 10. That is, the round bar 20 may extend transversely to the circuit breakers 10 so that a plurality of the circuit breakers 10 may be connected to the round bar 20 at the same time (see FIG. 6). As shown in FIGS. 2 and 4, where the connector bar 20 is a neutral bar 20, it is preferable for the neutral bar 20 to be electrically connected to a spaced apart neutral rail 62. The neutral rail 62 is common in electrical panels 22 and has a plurality of ports 68 to connect the neutral wires of the electrical circuits. The neutral wire ports 68 in the neutral rails 62 are on the outer sides of the rail 62 and can be seen in FIG. 6. As shown, the neutral ports 68 are aligned with the screw holes 64 on the top which are used to clamp the neutral wires to the neutral rail 62. As shown in FIG. 4, the connector 66 between the neutral bar 20 and the neutral rail 62 may be a bent portion 66 integral with the neutral bar 20, although another type of connector may be used.

Preferably, the curved inner surfaces 36, 38 of the elastic arms 32, 34 are oriented transversely with respect to the circuit breaker 10 when the respective electrical connector 20 of the panel 22 extends transversely to the circuit breakers 10. As shown in FIG. 3, the ends of the two elastic arms 32, 34 may be separated from each other to form an opening 42 therebetween to insert the electrical connector 20 therethrough to plug the first electrical clip 18 onto the connector 20. Thus, the opening 42 between the first and second curved inner surfaces 36, 38 is preferably large enough to allow the panel connector 20 to pass therethrough. If the opening 42 is smaller than the width of the panel connector 20, it is understood that the elastic arms 32, 34 may be flexed outward if desired to press the first electrical clip 18 onto the panel connector 20. Although the elastic arms 32, 34 may be shaped and sized as desired, it is believed that it may be desirable for the first curved inner surface 36 to wrap around a range 44 of between 40° and 95° where the first surface 36 contacts the panel connector 20. The second curved inner surface 38 also wraps around a range 46 of between 30° and 90° where the second surface 38 contacts the panel connector 20. Preferably, the total contact between the first and second curved inner surfaces 36, 38 and the panel connector is at least 180° (i.e., range 44+range 46). The opening 42 may also be oriented at an angle 48 of between 60° and 90° with respect to a vertical axis 50 through the circuit breaker 10. The size 52 of the opening 42 may also be between 70° and 185°. Preferably, the first and second elastic arms 32, 34 are made of copper and may be connected together with a bend 54 between the arms 32, 34. It is also preferable for a spring 56 to be provided, for example of spring steel, to press the elastic arms 32, 34 toward each other and towards the electrical connector 20 of the panel 22.

Figure 7:
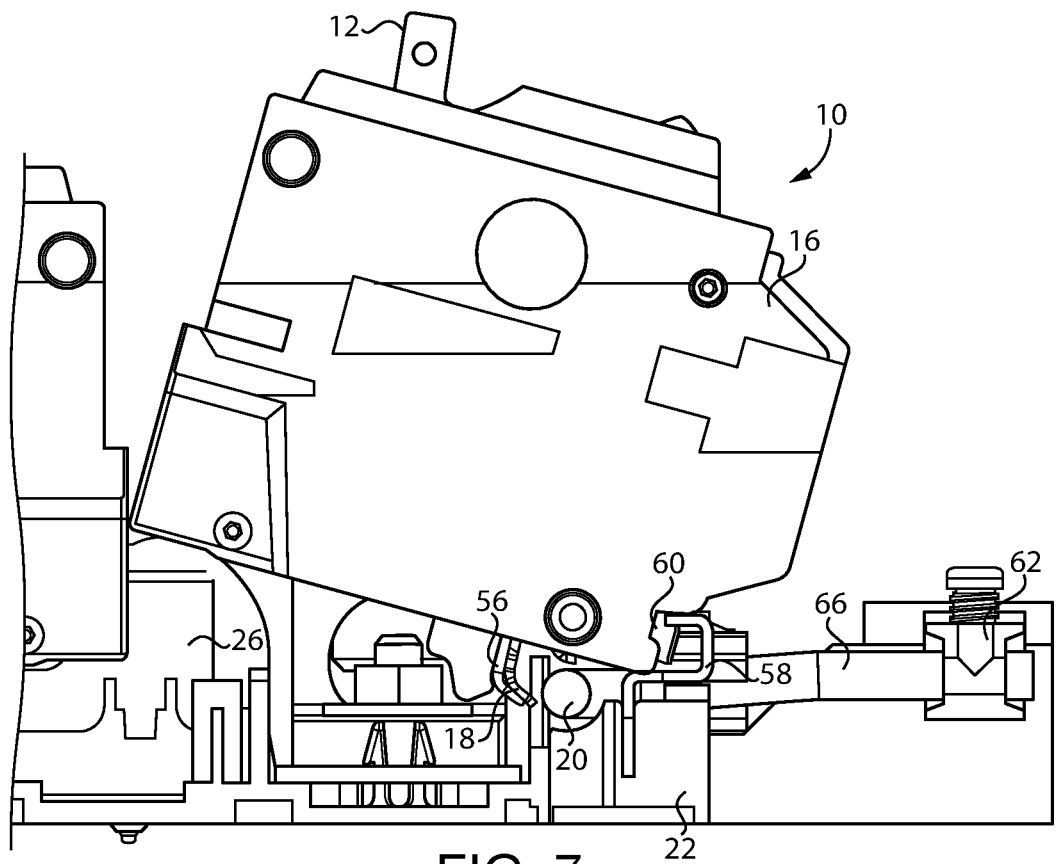
FIG. 7 is a side view of the circuit breaker in the process of being mounted onto the electrical panel.
Figure 8:
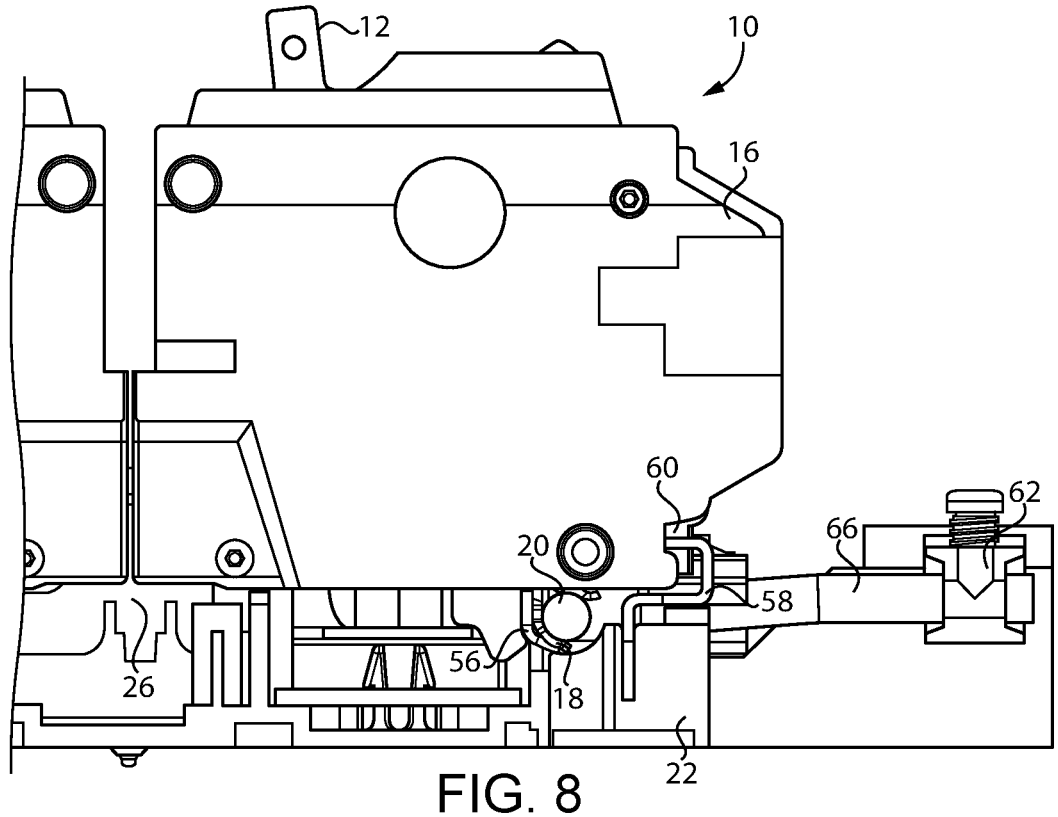
FIG. 8 is a side view of the circuit breaker of FIG. 7 after the circuit breaker has been plugged onto the electrical panel.

The circuit breaker 10 can be plugged onto the electrical panel 22 as shown in FIGS. 7-8. As shown in FIG. 7, the circuit breaker 10 is initially lowered onto the panel 22 at an angle. As shown, it may be desirable to provide the electrical panel 22 with a mounting rail 58 that may also extend transversely across the width of a plurality of circuit breakers 10 (see FIG. 4). The circuit breaker 10 may also be provided with a recess 60 or other structure that engages with the mounting rail 58 as the circuit breaker 10 is lowered onto the panel 22 at an angle. Once the circuit breaker 10 engages the mounting rail 58, the circuit breaker 10 is rotated downward around the mounting rail 58 to plug the first and second electrical clips 18, 24 onto the neutral bar 20 and the power supply bus 26, respectively. It is understood that the mounting rail 58 may not be needed in all embodiments and that the electrical clips 18, 24 may plug onto the panel 22 in different ways if desired. One advantage of the first electrical clip 18 is that the circuit breaker 10 may be more easily connected to the electrical panel 22 since the electrical clip 18 can engage with the neutral bar 20 within a wide range of angles. That is, the angle of attack that the user chooses to use when mounting the circuit breaker 10 is not particularly critical since successful engagement between the clip 18 and the bar 20 is possible within a wide range of attack angles. The connection between the clip 18 and the bar 20 is also rotatable which allows the clip 18 and the bar 20 to be connected or remain connected as the circuit breaker 10 is rotated downward to plug the second electrical clip 24 onto the power supply bus 26. It is understood that the aforementioned steps may be reversed to remove the circuit breaker 10 from the panel 22.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A circuit breaker, comprising:
   an electrical switch adapted to open an electrical circuit when an electrical anomaly occurs in the electrical circuit;
   a switch lever adapted to manually engage and disengage the electrical switch;
   a first electrical clip comprising:
      a first elastic arm with a first curved inner surface adapted to contact a first curved outer surface of an electrical connector, the first electrical clip being electrically connected to the electrical switch to permit detection of the electrical anomaly, and
      a second elastic arm with a second curved inner surface adapted to contact a second curved outer surface of the electrical connector, and the first and second curved inner surfaces facing each other to wrap around a portion of the electrical connector; and
   wherein the first and second curved inner surfaces form an opening therebetween to insert the electrical connector therethrough;
   wherein the opening is angled within a range between 60° and 90° with respect to a vertical axis through the circuit breaker.

2. The circuit breaker according to claim 1, wherein the first curved inner surface is oriented transversely to the circuit breaker.

3. The circuit breaker according to claim 1, wherein the first curved inner surface wraps around a range between 40° and 95° to contact the first curved outer surface along said range.

4. The circuit breaker according to claim 1, wherein both the first and second elastic arms being electrically connected to the electrical switch to detect the electrical anomaly.

5. The circuit breaker according to claim 4, wherein the second curved inner surface wraps around a range between 30° and 90° to contact the second curved outer surface along said range.

6. The circuit breaker according to claim 5, wherein the first and second curved inner surfaces together wrap around at least 180° to contact the first and second curved outer surfaces along said range.

7. The circuit breaker according to claim 1, wherein a size of the opening is in a range between 70° and 185°.

8. The circuit breaker according to claim 1, wherein the first elastic arm extends out a bottom of the circuit breaker and the switch lever extends out a top of the circuit breaker.

9. The circuit breaker according to claim 1, wherein the circuit breaker is a ground fault circuit breaker, an arc-fault circuit breaker or a combined ground fault/arc-fault circuit breaker.

10. The circuit breaker according to claim 1, further comprising a second electrical clip electrically connected to the electrical switch, electrical current flowing through the second electrical clip to supply electrical power to the electrical circuit, and the electrical switch breaking the supply of electrical power when the electrical switch is opened.

11. The circuit breaker according to claim 10, further comprising an electrical connecting lug, the electrical power being supplied from the second electrical clip to the electrical connecting lug when the electrical switch is closed.

12. The circuit breaker according to claim 1, wherein the first elastic arm is made of copper.

13. The circuit breaker according to claim 12, wherein the first electrical clip further comprises a spring exerting a bias force against the elastic arm toward the electrical connector.

14. The circuit breaker according to claim 1, wherein the circuit breaker is rated for 120-240 volts.

15. An electrical panel comprising the circuit breaker according to claim 1, the electrical panel being adapted to mount a plurality of the circuit breaker thereon.

16. The electrical panel according to claim 15, wherein the electrical connector is a bar in the electrical panel extending transversely to the plurality of the circuit breaker mounted on the panel.

17. The electrical panel according to claim 16, wherein the bar has a circular cross-section.

18. The electrical panel according to claim 15, further comprising a neutral rail adapted to connect a plurality of neutral wires thereto, the electrical connector being electrically connected to the neutral rail.

19. The electrical panel according to claim 15, wherein the electrical connector comprises an electrical supply bus.

20. The electrical panel according to claim 15, further comprising a mounting rail, the circuit breaker engaging the mounting rail at an angle as the circuit breaker is being mounted on the electrical panel, the circuit breaker being rotated downward around the mounting rail to mount the circuit breaker such that the first electrical clip engages the electrical connector as the circuit breaker is rotated downward.

* * * * *